(12) United States Patent
Maurice et al.

(10) Patent No.: US 12,472,390 B2
(45) Date of Patent: Nov. 18, 2025

(54) ATTACHMENT DEVICE TO AN ANCHOR POINT AND METHOD FOR USING THE ATTACHMENT DEVICE

(71) Applicant: ZEDEL, Crolles (FR)

(72) Inventors: Alain Maurice, Saint Hilaire du Touvet (FR); Benoît Vuillermoz, Saint-Martin-d'Hères (FR); Jules Tarrajat, Voiron (FR)

(73) Assignee: ZEDEL, Crolles (FR)

( * ) Notice: Subject to any disclaimer, the term of this patent is extended or adjusted under 35 U.S.C. 154(b) by 902 days.

(21) Appl. No.: 17/684,807

(22) Filed: Mar. 2, 2022

(65) Prior Publication Data

US 2022/0314044 A1  Oct. 6, 2022

(30) Foreign Application Priority Data

Mar. 31, 2021 (FR) ........................... 2103341

(51) Int. Cl.
*A62B 35/00* (2006.01)
*A63B 29/02* (2006.01)
*F16B 2/08* (2006.01)
*A62B 1/04* (2006.01)

(52) U.S. Cl.
CPC .......... *A62B 35/0068* (2013.01); *A63B 29/02* (2013.01); *F16B 2/08* (2013.01); *A62B 1/04* (2013.01)

(58) Field of Classification Search
CPC ..... A63B 29/02; A63B 27/00; A62B 35/0068; A62B 1/04; F16B 2/08
See application file for complete search history.

(56) References Cited

U.S. PATENT DOCUMENTS

| 8,851,232 | B2 * | 10/2014 | Raoul Bingham .... A63B 29/02 182/5 |
| 9,126,062 | B2 * | 9/2015 | Chabod .................... A62B 1/14 |
| 9,533,192 | B2 * | 1/2017 | Maurice ................. A63B 29/02 |
| 10,220,225 | B2 * | 3/2019 | Gamba .................... A62B 35/04 |
| 11,401,138 | B2 * | 8/2022 | Bonnet ................... B66D 3/046 |
| 12,023,531 | B2 * | 7/2024 | Tarrajat ............. A62B 35/0068 |
| 12,070,630 | B2 * | 8/2024 | Cowell ................ B66D 1/7489 |
| 2006/0185934 | A1 | 8/2006 | Hanson |
| 2011/0232995 | A1 * | 9/2011 | Rogelja .................... A62B 1/14 182/5 |

(Continued)

FOREIGN PATENT DOCUMENTS

| DE | 19520860 A1 * | 12/1996 | ............... A62B 1/14 |
| DE | 10220758 A1 | 11/2003 | |

(Continued)

*Primary Examiner* — Patrick D Hawn
(74) *Attorney, Agent, or Firm* — Oliff PLC

(57) ABSTRACT

An attachment device to an anchor point comprises a wire-like element provided with two ends a first end of which has a first ring. A clamp has two ends a first end of which can be inserted in the first ring. The second clamp end presents a second cross-section larger than the first cross-section. The first clamp end defines a through hole receiving a rope supporting a user. The second end of the wire-like element is fixed to the clamp via a first attachment point between the through hole and the second clamp end. A cord has a first end fixed to the clamp via a second attachment point and a second end with a second ring.

14 Claims, 4 Drawing Sheets

(56) References Cited

U.S. PATENT DOCUMENTS

| | | | |
|---|---|---|---|
| 2012/0118666 A1 | 5/2012 | Raoul Bingham | |
| 2014/0138191 A1* | 5/2014 | Chabod | A62B 1/14 |
| | | | 188/65.1 |
| 2024/0042282 A1* | 2/2024 | Brown | F16G 11/106 |

FOREIGN PATENT DOCUMENTS

| | | | | |
|---|---|---|---|---|
| DE | 102005018022 B3 | 10/2006 | | |
| DE | 202010013038 U1 | 2/2011 | | |
| DE | 102016101649 A1 * | 8/2017 | | A63B 29/02 |
| DE | 102021108078 A1 * | 10/2022 | | A62B 1/14 |
| FR | 3094646 A1 | 10/2020 | | |
| GB | 2500483 A * | 9/2013 | | A62B 1/14 |
| JP | 2014508897 A * | 4/2014 | | A63B 29/02 |
| WO | 2015/025117 A1 | 2/2015 | | |
| WO | 2020/201570 A1 | 10/2020 | | |

* cited by examiner

ATTACHMENT DEVICE TO AN ANCHOR POINT AND METHOD FOR USING THE ATTACHMENT DEVICE

BACKGROUND OF THE INVENTION

The invention relates to an attachment device to an anchor point and to a method for using the attachment device.

PRIOR ART

In the field of tree care, it is known to use a friction saver defining a temporary anchoring system. The friction saver is formed by a strap that forms a ring around a branch or the trunk of a tree, preferably to clamp its anchor point. The friction saver has a strap provided with opposite first and second ends and a central ring. The central ring collaborates with the first end so that the first end passes through the ring of the strap to form a sliding loop that encircles a branch or the trunk of the tree. The first end acts as anchor point for the climber. The climber applies a force on the first end which clamps the branch of the tree firmly by closing the sliding loop. The first end of the strap is associated with a first metal ring and the second end is associated with a second metal ring having an internal dimension that is smaller than that of the first metal ring.

The climber installs his work rope in the first and second metal rings that are attached to the branch of the tree to form an anchor point.

Once the tree care work has been completed, the strap forming the friction saver has to be retrieved.

To retrieve the friction saver, the retrieval ball is fixed to the work rope and the work rope is then pulled to extract it from the two metal rings. The retrieval ball passes through the first metal ring and remains stuck in the second metal ring so that the tractive force applied on the rope pulls on the second end of the strap and opens the sliding loop.

Once the strap loop has opened, the strap can be made to drop from the tree by pulling on the work rope attached to the strap by the retrieval ball.

It is apparent that this solution is not satisfactory in use as it is commonplace for the friction saver to remain stuck in particular in the tree. This results in particular from all the friction forces that exist between the tree, the strap and the work rope. A requirement exists to reduce the risk of the friction saver remaining stuck in the tree in order to facilitate retrieval of the device forming the friction saver.

OBJECT OF THE INVENTION

The object of the invention is to remedy these shortcomings and in particular to propose an attachment device to an anchor point that is easier to use than the configurations of the prior art. For this purpose, the attachment device to an anchor point comprises:
- a wire-like element comprising a first wire-like element end and an opposite second wire-like element end, the first wire-like element end having a first ring with a first pass-through cross-section;
- a clamp having a first clamp end and a second clamp end opposite the first clamp end, the first clamp end having a smaller first cross-section than the pass-through cross-section so that the first clamp end is able to be inserted in the first ring, the second clamp end presenting a larger second cross-section than the first cross-section, the first clamp end defining a through hole designed to receive a rope able to support a user, the through hole having a second pass-through cross-section, the second end of the wire-like element being fixed to the clamp via a first attachment point arranged between the through hole and the second clamp end;
- a cord having a first cord end fixed to the clamp via a second attachment point and a second cord end having a second ring, the second ring defining a third pass-through cross-section that is smaller than the second pass-through cross-section.

According to one embodiment, the clamp has a roller fitted in rotatable manner, the roller forming one edge of the through hole.

Advantageously, the second clamp end defines a groove extending in the longitudinal direction connecting the first clamp end to the second clamp end.

In one development, the second attachment point separates the first attachment point and the second clamp end.

Preferentially, the second cross-section of the second clamp end is larger than the first pass-through cross-section of the ring to define a stop surface of the wire-like element along the clamp.

In a particular embodiment, the stop surface is separated from the first attachment point by a larger distance than the width of the wire-like element.

Advantageously, the stop surface is separated from the second attachment point by a larger distance than the width of the wire-like element.

In preferential manner, the clamp is curved and defines an angle of curvature at least equal to 60° or at least equal to 90°.

In an advantageous configuration, the first attachment point and the second attachment point are located on the outer surface of the clamp corresponding to the surface farthest from the centre of curvature.

In a particular embodiment, the cord has a length enabling it to pass through the through hole of the clamp.

It is particularly advantageous to provide an attachment device that comprises a rope passing through the through hole of the clamp and the second ring of the cord, the rope being terminated by a retrieval ball having a cross-section that is smaller than the second pass-through cross-section and larger than the third pass-through cross-section.

It is a further object of the invention to provide a method for using an attachment device that makes uninstallation of the attachment product easier in comparison with the prior art methods. The method for using an attachment device according to one of the foregoing configurations comprises the following steps:
- providing the attachment device in which the wire-like element passes round the anchor point, the loop formed by the wire-like element around the anchor point being closed by means of the clamp, the rope being installed in the second ring and in the through hole;
- pulling on the rope so that the end of the rope terminated by a retrieval ball passes through the through hole and is blocked against the second ring;
- pulling on the rope so that the ring slides along the clamp until the ring leaves the clamp.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

Figure 1:
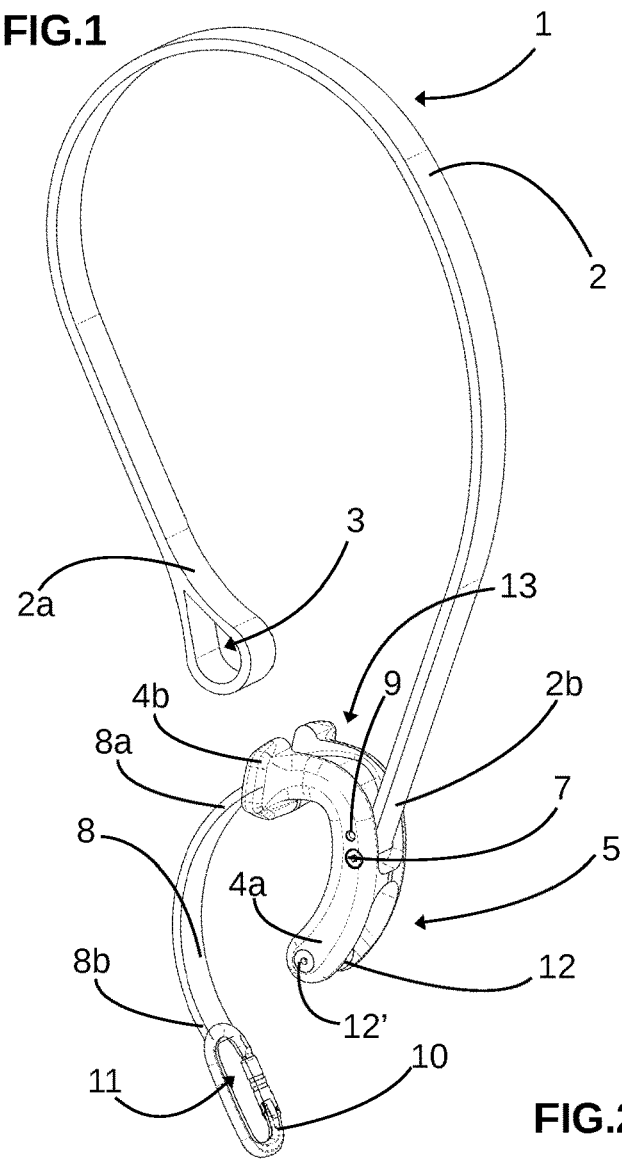
FIG. 1 schematically illustrates a view of an attachment device.
Figure 2:
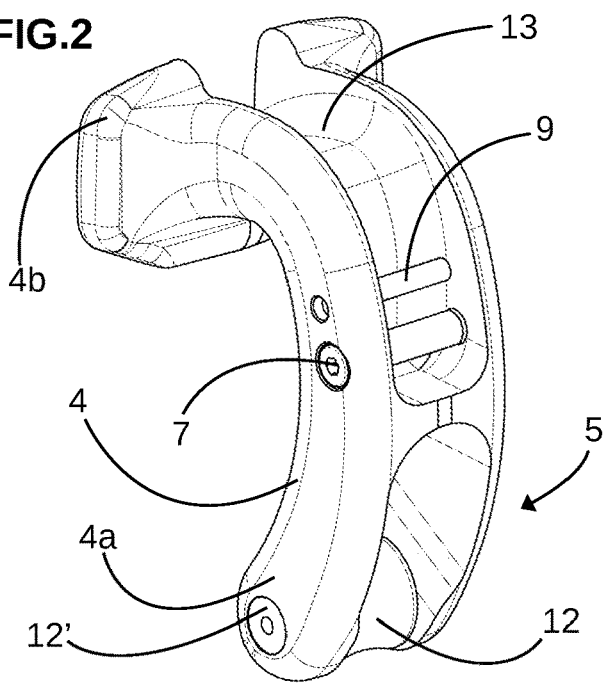
FIG. 2 schematically illustrates a perspective view of the clamp.
Figure 3:
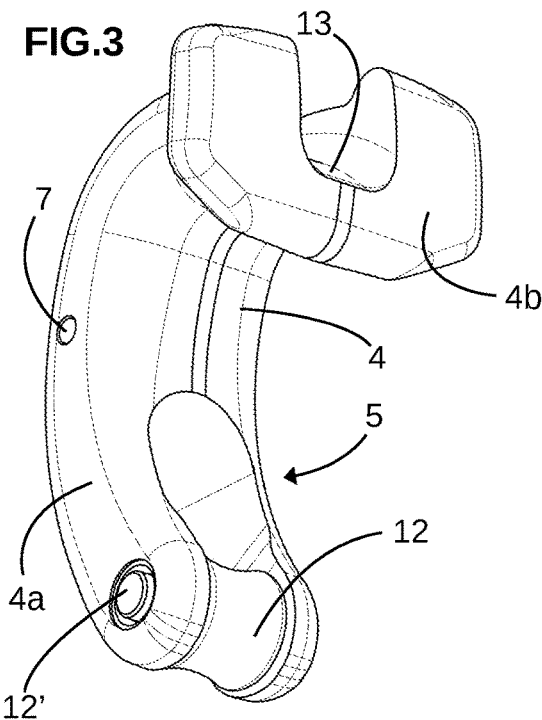
FIG. 3 schematically illustrates another perspective view of the clamp.
Figure 4:
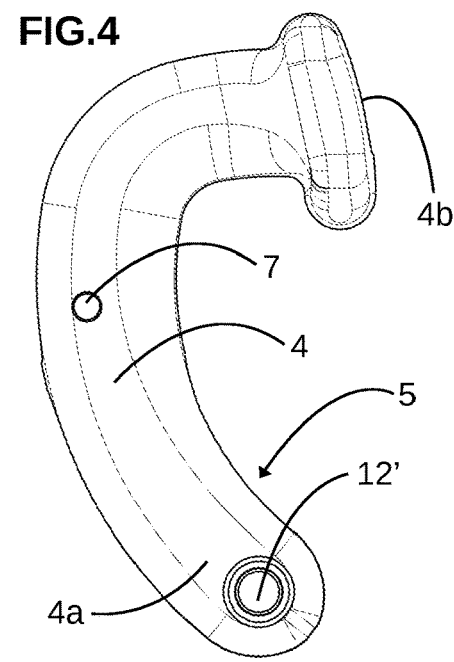
FIG. 4 schematically illustrates a side view of the clamp.
Figure 5:
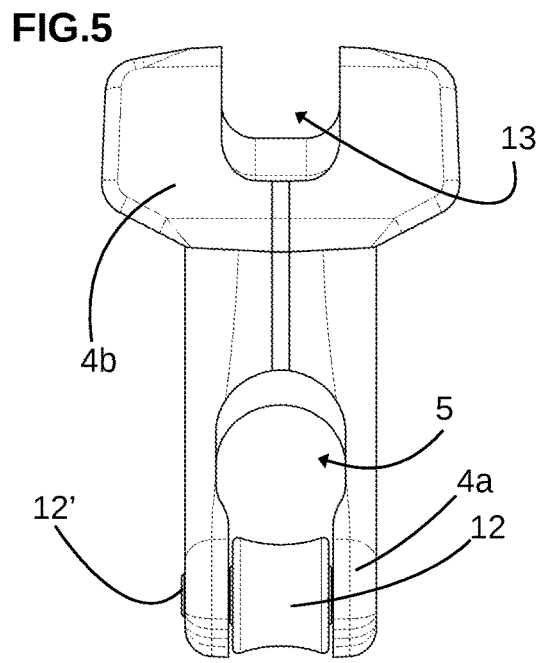
FIG. 5 schematically illustrates a front view of the clamp.

Attachment device 1 to an anchor point is designed to form an attachment device on an anchor point that is preferentially a tree trunk A or branch B.

Attachment device 1 to an anchor point comprises a wire-like element 2, comprising a first wire-like element end 2a and an opposite second wire-like element end 2b. First wire-like element end 2a defines a first ring 3. First ring 3 defines a first through opening with a first pass-through cross-section. Wire-like element 2 is preferentially a strap or a rope. Wire-like element 2 is dimensioned to support the weight of the user or the load to be hoisted.

Attachment device 1 to an anchor point comprises a clamp 4 that has a first clamp end 4a and a second clamp end 4b opposite first clamp end 4a. First clamp end 4a has a smaller first cross-section than the pass-through cross-section so that first clamp end 4a is able to be inserted in through opening 3. Second clamp end 4b presents a larger second cross-section than the first cross-section. First clamp end 4a defines a through hole 5 designed to receive a rope 6 designed to support a user. Second through opening 5 has a second pass-through cross-section. Second wire-like element end 2b is fixed to clamp 4 via a first attachment point 7 arranged between through hole 5 and second clamp end 4b. Clamp 4 can be made from plastic, metal or an association of the latter. Clamp 4 is dimensioned to support the weight of the load to be hoisted.

Attachment device 1 to an anchor point comprises a cord 8 having a first cord end 8a fixed to clamp 4 via a second attachment point 9 and a second cord end 8b having a second ring 10. Second ring 10 defines a second through opening 11 with a smaller third pass-through cross-section than the second pass-through cross-section. Second ring 10 can be formed by a carabiner or snap-hook, a quick link or any other openable connector. Cord 8 can present lower mechanical performances than those of wire-like element 2 as it is not designed to support the weight of the load to be hoisted. In the illustrated embodiments, cord 8 is different from wire-like element 2, but it is also possible for cord 8 and wire-like element 2 to form two ends of one and the same part, for example the same strap. The part passes through a hole of clamp 4. In this particular case, first attachment point 7 coincides with second attachment point 9.

Clamp 4 is a part that is more rigid than wire-like element 2 or is a rigid part. Preferentially, clamp 4 is a part the shape of which does not change when it is mechanically stressed to the point of mechanical breaking of clamp 4. When the user is suspended by means of rope 6 pressing on clamp 4, clamp 4 keeps its shape. Sliding of ring 3 along clamp 4 takes place on a part the shape of which is known.

First end 4a of clamp 4 can be inserted in ring 3 of first end 2a of wire-like element 2. Wire-like element 2 and clamp 4 form a loop encircling the anchor point. First end 4a receives rope 6 designed to support a user. First end 4a is mechanically stressed by means of rope 6. Second end 4b is wider than first end 4a which complicates or prevents ring 3 of wire-like element 2 from advancing over the whole length of clamp 4. Through hole 5 receives rope 6. Ring 3 slides along first end 4a over a distance that ensures that through hole 5 is not covered by ring 3. The weight of the user applied on rope 6 places a stress on clamp 4 keeping loop C in the closed state.

Cord 8 places a stress on second end 4b of clamp 4. By pulling on second end 8b of cord 8, the cord stresses second end 4b. When loop C is closed, the two ends 4a and 4b of clamp 4 are separated by ring 3. Application of a force on one or the other of the ends of the clamp moves the latter to a position that tends to the open position or to a position that keeps it in the closed position.

By pulling on cord 8, clamp 4 swivels around the contact point between ring 3 and clamp 4 which has the effect of making ring 3 slide towards first end 4a of clamp 4 until loop C opens. When the user is suspended by means of rope 6 fitted in through hole 5, the user's weight prevents clamp 4 from rocking or blocks ring 3 against clamp 4.

Clamp 4 closes loop C that surrounds the anchor point and the orientation of clamp 4 allows or prevents opening of loop C. The orientation of clamp 4 is defined by the forces applied on the two ends of clamp 4. Clamp 4 swivels with respect to ring 3.

In preferential manner, clamp 4 has a roller 12 that is mounted rotatably, roller 12 forming one edge of first through opening 5. Roller 12 is mounted movable in rotation so that first clamp end 4a is provided with a pulley. Installation of a pulley facilitates movement of rope 6 by reducing the frictions which also has the effect of reducing its wear. It is particularly advantageous to form a pulley integrated in rigid manner in clamp 4 to facilitate movement of the rope without increasing the risk of jamming of the rope. Roller 12 is mounted rotatable around a tree 12'. When the user pulls on rope 6, the latter moves and presses on roller 12.

In a particular embodiment, second clamp end 4b defines a groove 13 extending in the longitudinal direction connecting first clamp end 4a to second clamp end 4b. Groove 13 is configured to receive cord 8 and to facilitate installation of cord 8 in the volume of clamp 4. Cord 8 extends from second attachment point 9 in the direction of second end 4b. When cord 8 is pulled, the latter is inserted in groove 13 and presses on second clamp end 4b tending to make clamp 4 pivot to direct ring 3 towards first end 4a.

Advantageously, second attachment point 9 separates first attachment point 7 and second clamp end 4. This configuration simplifies the design of clamp 4. By pulling on second end 8b, the position of second attachment point 9 facilitates rocking of clamp 4. This configuration is all the more advantageous as clamp 4 presents a groove 13 facilitating rotation of clamp 4. It is advantageous for first attachment point 7 to be located in groove 13. It is also possible to have first attachment point 7 and second attachment point 9 formed by the same element. For example, wire-like element 2 and cord 8 are both terminated by a loop or at least a loop that passes through a rod fixed to the clamp to form the two attachment points, and it is advantageous to provide for the same rod to pass through the loops. It is also possible for wire-like element 2 to be fixed to clamp 4 and for cord 8 to be fixed to wire-like element 2 near the first attachment point which then forms the second attachment point. As an alternative, cord 8 is fixed to clamp 4 and wire-like element 2 is fixed to cord 8 near second attachment point 9 forming first attachment point 7. However, these variants are less efficient for retrieval of clamp 4.

In a preferential embodiment, the second cross-section of second clamp end 4b is larger than the first pass-through cross-section of ring 3 to define a stop surface of wire-like element 2 along clamp 4. In other words, second end 4b is wider than the hole formed by ring 3. Clamp 4 cannot be inserted in the ring and then pass through the latter over its whole length. It is particularly advantageous to have a second end 4b that is wide enough to prevent ring 3 from escaping from clamp 4. In this way, the loop formed by wire-like element 2 is closed by clamp 4. The force applied by rope 6 on first end 4a blocks ring 3 against second end 4b. Second end 4b forms a stop surface against which ring 3 comes into abutment.

Clamp 4 presents a sliding coefficient with wire-like element 2 that is lower than the sliding coefficient between wire-like element 2 and rope 6 or cord 8.

When cord 8 extends from second attachment point 9 to second end 4b, cord 8 passes through ring 3 facilitating rocking of clamp 4 when cord 8 is pulled. Preferentially, clamp 4 is smooth to enhance sliding of ring 3.

In preferential manner, the stop surface is separated from first attachment point 9 by a larger distance than the width of wire-like element 2. In this way, once it has been tensed by means of rope 6, first end 2a of the wire-like element places itself in a position that clearly opposes rocking of clamp 4. This configuration enhances safety in the event of an undesirable force being exerted on cord 8.

Advantageously, the stop surface is separated from the second attachment point by a larger distance than the width of the wire-like element. Here again this enhances safety by requiring movement of the clamp over a relatively large distance before rocking of the clamp and opening of the loop take place.

In a particularly advantageous embodiment illustrated in the figures, the clamp is curved between first end 4a and second end 4b. It is advantageous to have a curved clamp in order to better differentiate between a position where the clamp keeps the loop in the closed state and a clamp position allowing opening of the loop. The use of a curved clamp makes for a gain in compactness thereby reducing the risks of blocking in the branches of a tree when a tree care operation is performed. To clearly differentiate between the two positions, it is advantageous to have a clamp that defines an angle of curvature at least equal to 60°, preferably at least equal to 90°. The use of a curved clamp also makes it easier to free the loop when on the ground.

The angle of curvature can be represented by the angle formed by the plane tangent to the two ends of the sliding surface of the ring on clamp 4. A tangent plane corresponds to the ring blocked on the clamp, preferentially against the stop surface. The other tangent plane corresponds to the ring just before it leaves clamp 4 to open the loop.

In order to gain in compactness, it is advantageous for the clamp to present a smaller mean radius of curvature in the second end than in the first end. First end 4a and second end 4b can be delineated by first attachment point 7. It is also advantageous for the second end to have a larger curvature than the first end, for example an angle of curvature in the second end that is twice that of the angle of curvature in the first end.

In preferential manner, the first attachment point and second attachment point are located on the outer surface of the clamp corresponding to the surface farthest from the centre of curvature of clamp 4.

It is particularly advantageous for cord 8 to have a length enabling it to pass through the through hole 5 of clamp 4. When rope 6 is stretched taut, the risk of stressing cord 8 is lesser as it is hanging at a lower height than first clamp end 4. Such an embodiment is illustrated in the figures.

To be able to retrieve the clamp easily, it is advantageous to use a rope 6 passing through the through hole 5 of clamp 4 and the second through opening of cord 8. Rope 6 is terminated by a retrieval ball 14 having a cross-section that is smaller than the second pass-through cross-section and larger than the third pass-through cross-section. As an alternative, another rope is fixed to the rope and the other rope is equipped with the retrieval ball.

Figure 6:
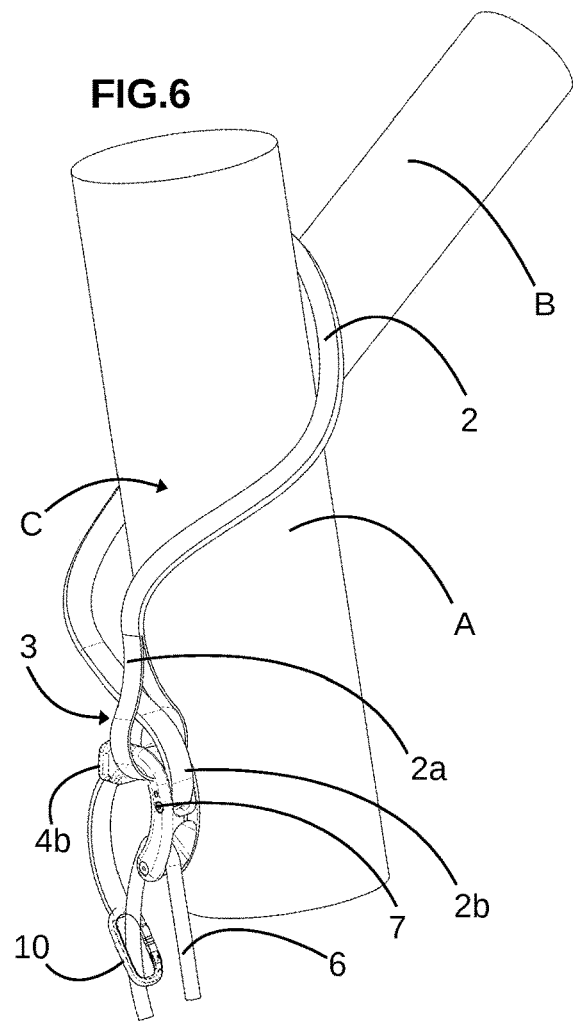
FIG. 6 schematically illustrates an attachment device installed around a tree trunk or branch.
Figure 7:
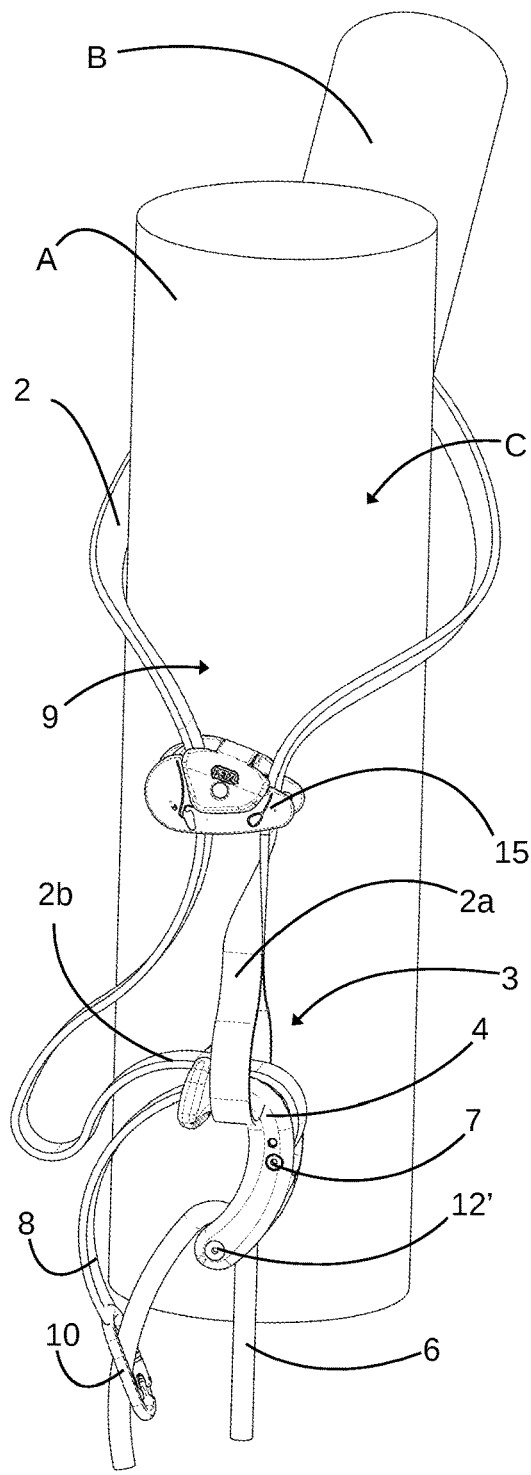
FIG. 7 schematically illustrates a first step of uninstallation of the attachment device.

To form a suspension point of a user attached to rope 6, wire-like element 2 passes round the anchor point. In FIGS. 6 and 7, wire-like element 2 passes round tree trunk A and presses on a branch B. Loop C formed by wire-like element 2 around trunk A is closed by means of clamp 4. In the particular embodiment illustrated, second end 2b of wire-like element 2 passes through ring 3. Second end 4b of clamp 4 is pressing on ring 3. When the user is suspended by means of rope 6, second end 4b forces on ring 3 via the stop surface. Loop C is pulled tight. Rope 6 is installed in second ring 10 and in through hole 5. In the particular embodiment illustrated in FIG. 7, an intermediate clamp 15 is fitted between the two ends of wire-like element 2. The intermediate clamp enables the length of loop C to be defined.

Figure 8:
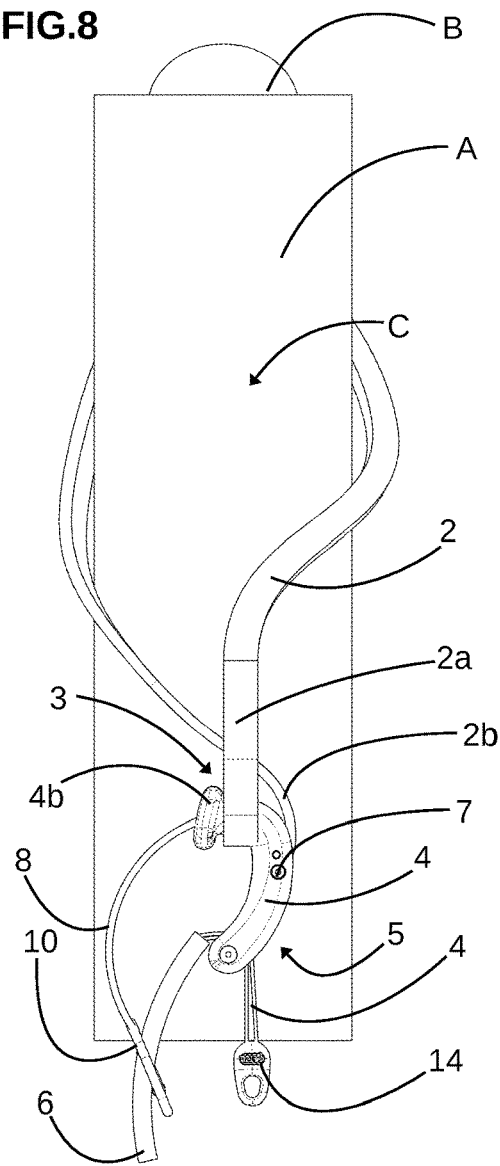
FIG. 8 schematically illustrates a second step of uninstallation of the attachment device.
Figure 9:
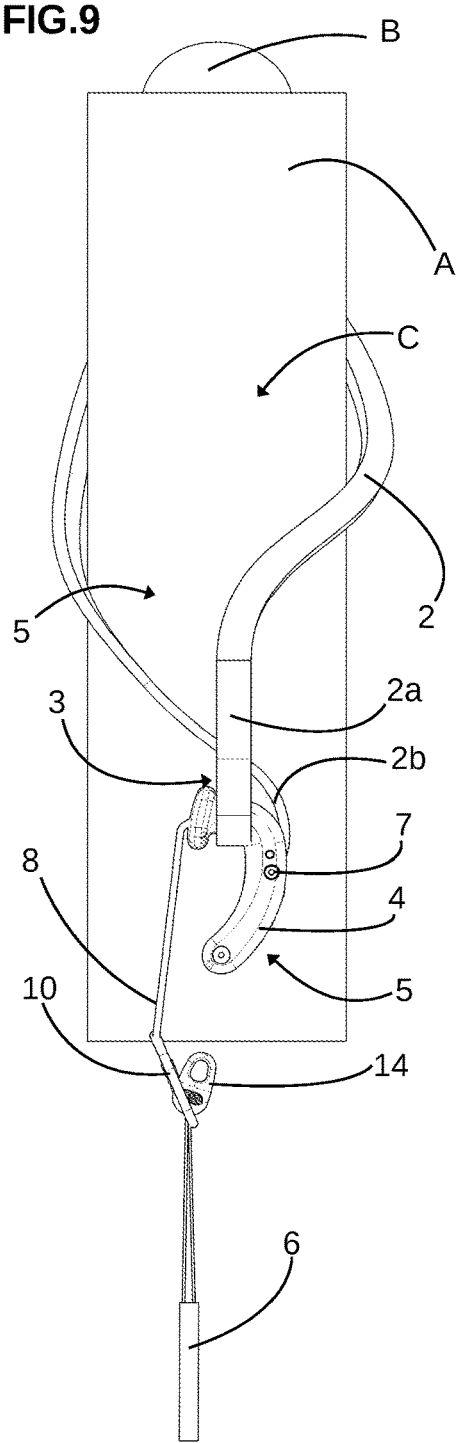
FIG. 9 schematically illustrates a third step of uninstallation of the attachment device.
Figure 10:
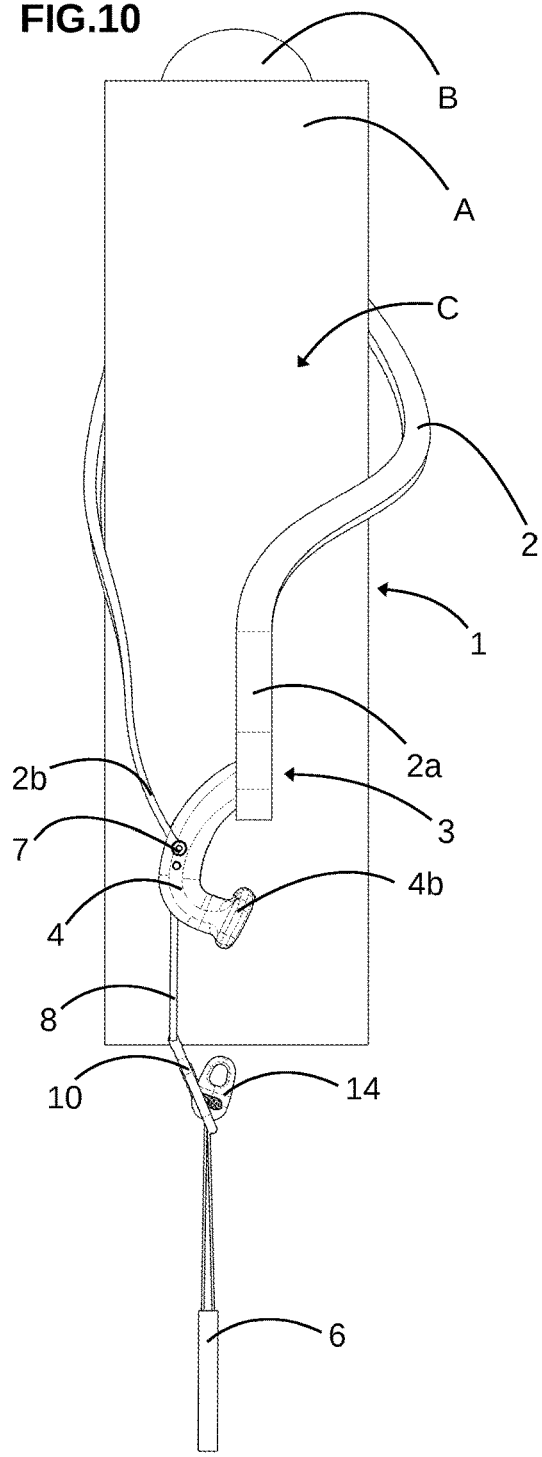
FIG. 10 schematically illustrates a fourth step of uninstallation of the attachment device.

To release the attachment device and retrieve the latter after use, it suffices to pull on rope 6 so that the end of rope 6 terminated by retrieval ball 14 passes through the through hole 5 and is blocked against second ring 10. This step is illustrated in FIGS. 8 and 9.

Once retrieval ball 12 is in contact with second ring 10, the traction applied on rope 6 results in a traction on cord 8 that makes ring 3 slide along clamp 4 until the clamp comes out of ring 3 and loop C opens. Once loop C has opened, by pulling on rope 6, wire-like element 2 can slide against the trunk. It is advantageous for ring 3 to be formed by a fold of wire-like element 2. The risk of wire-like element 2 or ring 3 getting stuck around the trunk is slight. Clamp 4 and wire-like element 2 are connected to rope 6 which results in them being easier to retrieve.

The invention claimed is:

1. Attachment device to an anchor point comprising:
a wire element comprising a first wire element end and an opposite second wire element end, the first wire element end having a first ring with a first pass-through cross-section, the wire element being designed to pass around the anchor point;
a clamp having a first clamp end and a second clamp end opposite the first clamp end, the first clamp end having a smaller first cross-section than the first pass-through cross-section so that the first clamp end pass through the first ring and form a loop around the anchor point, the second clamp end presenting a second cross-section that is larger than the first cross-section so that the second clamp end cannot pass through the first ring, the first clamp end defining a through hole designed to receive a rope able to support a user, the through hole having a second pass-through cross-section, the second end of the wire element being fixed to the clamp via a first attachment point located between the through hole and the second clamp end, the clamp being a part that is more rigid than the wire element, the second end of the clamp being separated from the through hole by the first ring when the first end of the clamp passes through the first ring;

a cord having a first cord end fixed to the clamp via a second attachment point and a second cord end having a second ring, the second ring defining a third pass-through cross-section that is smaller than the second pass-through cross-section.

2. Attachment device to an anchor point according to claim 1 wherein the clamp has a roller mounted movable in rotation, the roller forming one edge of the through hole.

3. Attachment device to an anchor point according to claim 1 wherein the second clamp end defines a groove extending in the longitudinal direction connecting the first clamp end to the second clamp end.

4. Attachment device to an anchor point according to claim 1 wherein the second attachment point separates the first attachment point and the second clamp end.

5. Attachment device to an anchor point according to claim 1 wherein the second cross-section of the second clamp end is larger than the first pass-through cross-section of the ring to define a stop surface of the wire element along the clamp.

6. Attachment device to an anchor point according to claim 5 wherein the stop surface is separated from the first attachment point by a larger distance than the width of the wire element.

7. Attachment device to an anchor point according to claim 6 wherein the stop surface is separated from the second attachment point by a larger distance than the width of the wire element.

8. Attachment device to an anchor point according to claim 1 wherein the clamp is curved and defines an angle of curvature at least equal to 60°.

9. Attachment device to an anchor point according to claim 8 wherein the angle of curvature is at least equal to 90°.

10. Attachment device to an anchor point according to claim 8 wherein the first attachment point and the second attachment point are located on the outer surface of the clamp corresponding to the surface farthest from the centre of curvature.

11. Attachment device to an anchor point according to claim 9 wherein the first attachment point and the second attachment point are located on the outer surface of the clamp corresponding to the surface farthest from the centre of curvature.

12. Attachment device to an anchor point according to claim 1 wherein the cord has a length enabling it to pass through the through hole of the clamp.

13. Attachment device to an anchor point comprising:

a wire element comprising a first wire element end and an opposite second wire element end, the first wire element end having a first ring with a first pass-through cross-section;

a clamp having a first clamp end and a second clamp end opposite the first clamp end, the first clamp end having a smaller first cross-section than the first pass-through cross-section so that the first clamp end can be inserted in the first ring, the second clamp end presenting a second cross-section that is larger than the first cross-section, the first clamp end defining a through hole designed to receive a rope able to support a user, the through hole having a second pass-through cross-section, the second end of the wire element being fixed to the clamp via a first attachment point located between the through hole and the second clamp end, the clamp being a part that is more rigid than the wire element;

a cord having a first cord end fixed to the clamp via a second attachment point and a second cord end having a second ring, the second ring defining a third pass-through cross-section that is smaller than the second pass-through cross-section; and a rope passing through the through hole of the clamp and the second ring of the cord, the rope being terminated by a retrieval ball having a cross-section that is smaller than the second pass-through cross-section and larger than the third pass-through cross-section.

14. Method for using an attachment device comprising the following steps:

providing the attachment device comprising:

a wire element comprising a first wire element end and an opposite second wire element end, the first wire element end having a first ring with a first pass-through cross-section;

a clamp having a first clamp end and a second clamp end opposite the first clamp end, the first clamp end having a smaller first cross-section than the pass-through cross-section so that the first clamp end can be inserted in the first ring, the second clamp end presenting a second section that is larger than the first cross-section, the first clamp end defining a through hole designed to receive a rope able to support a user, the through hole having a second pass-through cross-section, the second end of the wire element being fixed to the clamp via a first attachment point located between the through hole and the second clamp end, the clamp being a part that is more rigid than the wire element;

a cord having a first cord end fixed to the clamp via a second attachment point and a second cord end having a second ring, the second ring defining a third pass-through cross-section that is smaller than the second pass-through cross-section passing the wire element around the anchor point, the loop formed by the wire element around the anchor point being closed by means of the clamp, the rope being installed in the second ring and in the through hole;

pulling on the rope so that the end of the rope terminated by a retrieval ball passes through the through hole and is blocked against the second ring;

pulling on the rope so that the ring slides along the clamp until the ring leaves the clamp.

* * * * *